US011390350B2

(12) United States Patent
Luckjohn et al.

(10) Patent No.: US 11,390,350 B2
(45) Date of Patent: Jul. 19, 2022

(54) SEAT CADDY FOR CHARGING CABLE

(71) Applicant: Harley-Davidson Motor Company Group, LLC, Milwaukee, WI (US)

(72) Inventors: Kenneth G. Luckjohn, Sheboygan, WI (US); Brian Michael Silovich, Waukesha, WI (US); Jonathan Bryant Robertson, New Prague, MN (US); Sean M. Stanley, Hartford, WI (US)

(73) Assignee: Harley-Davidson Motor Company Group, LLC, Milwaukee, WI (US)

( * ) Notice: Subject to any disclaimer, the term of this patent is extended or adjusted under 35 U.S.C. 154(b) by 419 days.

(21) Appl. No.: 16/532,852

(22) Filed: Aug. 6, 2019

(65) Prior Publication Data

US 2020/0047841 A1 Feb. 13, 2020

Related U.S. Application Data

(60) Provisional application No. 62/715,477, filed on Aug. 7, 2018.

(51) Int. Cl.
*B62K 19/46* (2006.01)
*B62J 1/12* (2006.01)
(Continued)

(52) U.S. Cl.
CPC .............. *B62K 19/46* (2013.01); *B60L 53/18* (2019.02); *B62J 1/12* (2013.01); *B60L 2200/12* (2013.01);
(Continued)

(58) Field of Classification Search
CPC .... B62K 19/46; B62K 11/00; B62K 2204/00; B60L 53/18; B60L 2200/12; B62J 1/12;
(Continued)

(56) References Cited

U.S. PATENT DOCUMENTS 5,421,427 A 6/1995 Ogawa et al.
5,477,936 A 12/1995 Sugioka et al.
(Continued)

FOREIGN PATENT DOCUMENTS

CN 1572646 A * 2/2005 ............. B60L 50/64
CN 101712353 A * 5/2010 ............. B62K 11/10
(Continued)

OTHER PUBLICATIONS

Machine translation of JP3343361B2 (Year: 2002).*

*Primary Examiner* — Suresh Memula
(74) *Attorney, Agent, or Firm* — Michael Best & Friedrich LLP

(57) ABSTRACT

An electric vehicle rechargeable via electric power transferred from a power outlet separate from the vehicle includes a seat movable between a first position for supporting a person and a second position. A caddy is positioned below the seat to define a cable storage volume. The cable storage volume is accessible when the seat is in the second position. A charging port is positioned outside of the caddy and accessible with the seat in the first position. A charging cable is positioned within the caddy, the charging cable having a first end engageable with the charging port of the vehicle and a second end engageable with the power outlet. The first and second ends of the charging cable are removable from the caddy when the seat is in the second position to enable charging the electric vehicle via the charging cable and the charging port.

21 Claims, 7 Drawing Sheets

(51) Int. Cl.
   *B60L 53/18* (2019.01)
   *B62K 11/00* (2006.01)

(52) U.S. Cl.
   CPC ....... *B60Y 2200/12* (2013.01); *B60Y 2200/91* (2013.01); *B60Y 2300/91* (2013.01); *B62K 11/00* (2013.01); *B62K 2204/00* (2013.01)

(58) Field of Classification Search
   CPC ............ B60Y 2200/12; B60Y 2200/91; B60Y 2300/91
   USPC ........................................................ 320/109
   See application file for complete search history.

(56) References Cited

U.S. PATENT DOCUMENTS

| | | | |
|---|---|---|---|
| 5,540,312 A | 7/1996 | Ogawa et al. | |
| 8,342,282 B2* | 1/2013 | Kuramochi | B62J 37/00 180/219 |
| 8,746,391 B2 | 6/2014 | Atsuchi et al. | |
| 8,776,933 B2* | 7/2014 | Toda | B62K 11/04 180/219 |
| 8,893,833 B2 | 11/2014 | Tsukamoto et al. | |
| 8,973,689 B2* | 3/2015 | Plazotta | B62J 43/28 180/65.1 |
| 8,973,698 B2 | 3/2015 | Matsuda | |
| 9,090,310 B2 | 7/2015 | Miyashiro | |
| 9,216,787 B2 | 12/2015 | Duncan et al. | |
| 2004/0238253 A1* | 12/2004 | Yonehana | B60L 53/16 180/219 |
| 2008/0223642 A1* | 9/2008 | Shiraishi | B62K 11/04 180/219 |
| 2008/0246315 A1* | 10/2008 | Ito | B62J 1/28 297/215.1 |
| 2013/0168171 A1* | 7/2013 | Buell | B62K 11/04 180/220 |
| 2013/0247881 A1* | 9/2013 | Okubo | F02M 25/0854 123/519 |
| 2017/0125993 A1* | 5/2017 | Krammer | B60L 53/18 |
| 2019/0329836 A1* | 10/2019 | Buell | B62J 43/28 |
| 2020/0223504 A1* | 7/2020 | Buell | B62J 1/08 |
| 2020/0339210 A1* | 10/2020 | Buell | B62K 19/12 |
| 2020/0398918 A1* | 12/2020 | Buell | B62J 6/03 |

FOREIGN PATENT DOCUMENTS

| | | | | |
|---|---|---|---|---|
| CN | 101847737 A | * | 9/2010 | ............. B62J 43/00 |
| CN | 101445140 B | * | 12/2011 | |
| CN | 103987562 A | * | 8/2014 | ............. B60L 53/14 |
| CN | 104853979 A | * | 8/2015 | ............. B62K 11/04 |
| CN | 105189275 A | * | 12/2015 | ............. B62K 11/10 |
| CN | 110248864 B | * | 12/2016 | |
| CN | 208257484 U | * | 12/2018 | |
| EP | 0741060 A2 | | 11/1996 | |
| EP | 1772360 A2 | * | 4/2007 | ............... B62J 7/04 |
| EP | 1961648 A2 | * | 8/2008 | ............. B62K 19/46 |
| EP | 2036809 A1 | * | 3/2009 | ............. B62J 35/00 |
| EP | 2157010 A2 | * | 2/2010 | ............. B62K 19/46 |
| EP | 2305548 A2 | * | 4/2011 | ............. B62J 43/16 |
| EP | 2305548 A2 | | 6/2011 | |
| EP | 2783954 A1 | * | 10/2014 | ............. B62K 11/00 |
| EP | 2796349 A1 | | 10/2014 | |
| EP | 2848456 A1 | * | 3/2015 | ............. B62K 11/02 |
| EP | 2939911 A1 | * | 11/2015 | ............. B60L 15/007 |
| EP | 2778032 B1 | * | 1/2019 | ............. B60L 58/20 |
| EP | 3450296 A1 | * | 3/2019 | ............... B62M 7/00 |
| ES | 2187358 A1 | | 6/2003 | |
| ES | 2242506 A1 | | 11/2005 | |
| JP | 3120243 B2 | | 12/2000 | |
| JP | 3343361 B2 | * | 11/2002 | ............. Y02E 60/10 |
| JP | 2012171556 A | * | 9/2012 | |
| JP | 2013129344 A | * | 7/2013 | |
| JP | 2013154858 A | * | 8/2013 | |
| JP | 5443152 B2 | | 3/2014 | |
| JP | 5764644 B2 | | 8/2015 | |
| JP | 2015174455 A | * | 10/2015 | |
| JP | 2016199236 A | * | 12/2016 | |
| WO | WO-2004031026 A1 | * | 4/2004 | ............... B62J 9/30 |
| WO | WO-2012085977 A1 | * | 6/2012 | ............. B62K 11/04 |
| WO | WO-2014112959 A1 | * | 7/2014 | ............. B62J 37/00 |
| WO | WO-2020052972 A1 | * | 3/2020 | ............. B62J 43/16 |

* cited by examiner

SEAT CADDY FOR CHARGING CABLE

CROSS-REFERENCE TO RELATED APPLICATIONS

This application claims priority to U.S. Provisional Patent Application No. 62/715,477, filed Aug. 7, 2018, the entire contents of which are incorporated by reference herein.

BACKGROUND

The present invention relates to a seat caddy for a vehicle, and more particularly to a seat caddy for a charging cable of an electric vehicle, such as an electric motorcycle.

SUMMARY

In one aspect, the invention provides an electric vehicle rechargeable via electric power transferred from a power outlet separate from the vehicle. The electric vehicle includes a seat movable between a first position for supporting a person and a second position, and a caddy is positioned below the seat to define a cable storage volume. The cable storage volume is accessible when the seat is in the second position. A charging port is positioned outside of the caddy and accessible with the seat in the first position. A charging cable is positioned within the caddy, the charging cable having a first end engageable with the charging port of the vehicle and a second end engageable with the power outlet. The first and second ends of the charging cable are removable from the caddy when the seat is in the second position to enable charging the electric vehicle via the charging cable and the charging port.

In another aspect, the invention provides a method of converting a vehicle from an operating configuration to a charging configuration. A seat of the vehicle is released from a first position in which a seating surface of the seat is presented for seating a vehicle user, and the seat is moved to a second position to uncover a caddy having a charging cable therein. The caddy is lifted from a stowed position to a presentation position by a linkage between the seat and the caddy in response to movement of the seat to the second position. The charging cable, including both first and second ends thereof, is removed from the underseat caddy. The first end of the charging cable is attached to a power outlet spaced from the vehicle, and the second end of the charging cable is attached to a charging port provided on the vehicle at a position outside of the caddy.

A vehicle includes a frame, a seat for supporting a person, and a caddy positioned below the seat. The seat is rotatable relative to the frame between a first position and a second position. The seat includes a latch engageable with the frame for selectively holding the seat in the first position. The seat further includes a first pivot defining a first rotational axis about which the seat is rotatable from the first position to the second position. The caddy is rotatable relative to the frame between a stowed position and a presentation position. The caddy includes a second pivot defining a second rotational axis about which the caddy is rotatable from the stowed position to the presentation position. A linkage is provided between the caddy and the seat and operable to rotate the caddy from the stowed position to the presentation position in response to movement of the seat between the first and second positions.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
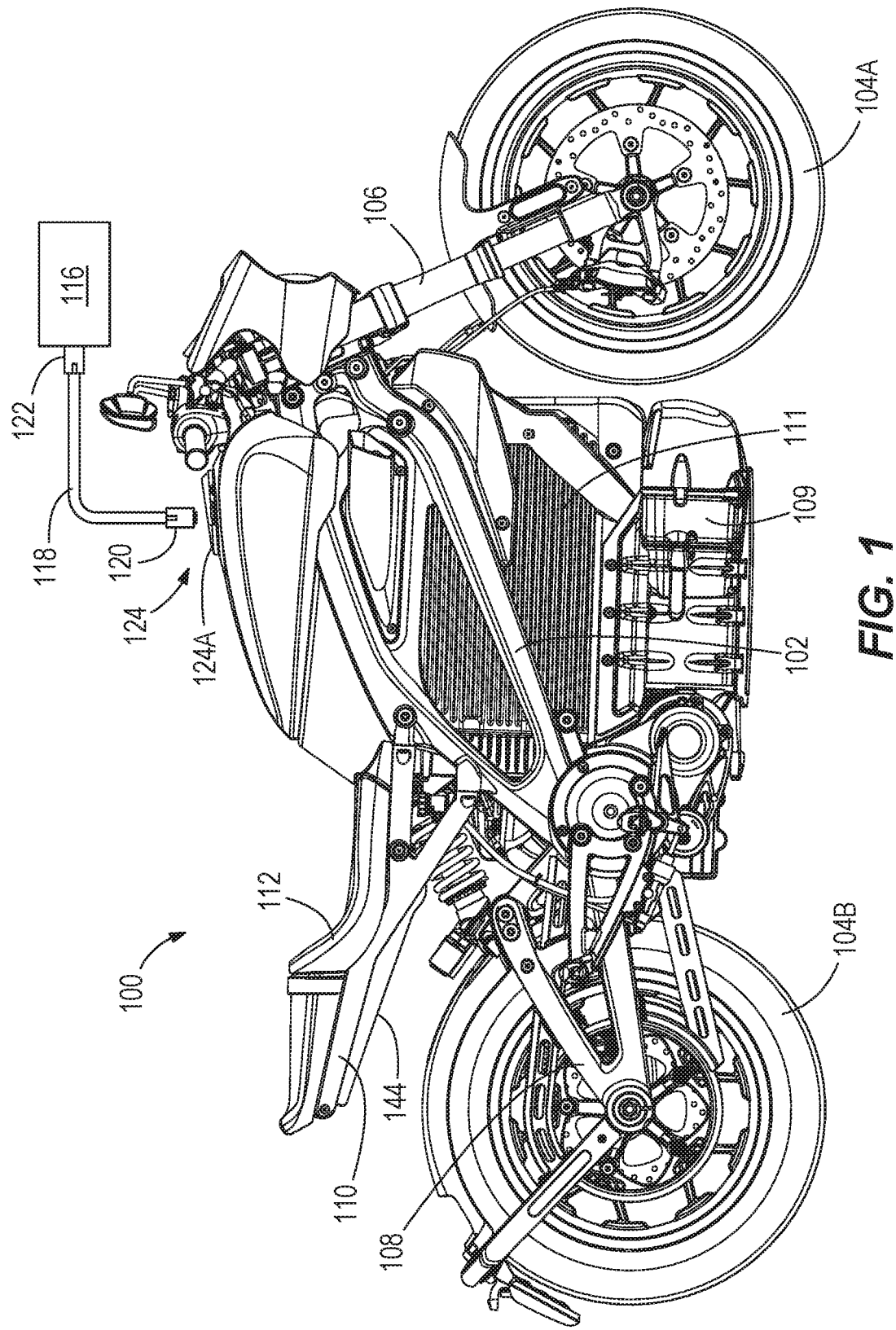
FIG. 1 is a side view of a vehicle, as shown, a motorcycle.

FIG. 1 illustrates a vehicle 100 having a frame 102 and a plurality of body panels. The vehicle 100 shown is a motorcycle and the frame 102 is attached to a front wheel 104A via a front fork/front suspension 106 and attached to a rear wheel 104B via a swing arm 108. The frame 102 includes a rider support sub-frame or seat frame 110 that supports a seat or saddle 112 for a person (i.e., user, driver, rider, occupant, and/or passenger) seated or otherwise positioned on the vehicle 100.

While the vehicle 100 is shown as a motorcycle, the vehicle can otherwise be embodied as another saddle-ridden vehicle such as an all-terrain vehicle, a snowmobile, a scooter, or a moped. The vehicle 100 may otherwise be a non-saddle-ridden vehicle such as a side-by-side off-roader or a golf cart, or may otherwise be an automobile (car, truck, etc.) where the frame 102 at least partially or fully surrounds an operator and/or passenger within the vehicle.

In some embodiments, the vehicle 100 may be an electric vehicle (EV), or more specifically a plug-in electric vehicle (PEV). The illustrated PEV 100 includes an electric motor 109 that is energized from an on-board battery unit 111 for propulsion of the vehicle. Plug-in electric vehicles are recharged (e.g., the battery unit 111 thereof) via external power sources or power outlets, as indicated by reference numeral 116. The external power outlet 116 may connect to grid power and may be an AC wall outlet (120 volt, 240 volt), a remote charging station, or a large DC power storage system. A charging cable 118 connects the vehicle 100 to the power outlet 116 to charge the vehicle 100. More specifically, the vehicle 100 includes a charging port 124. The charging port 124 is accessible for connection by opening or removing a cover 124A. A first electrical connector or first end 120 of the charging cable 116 is connected with (e.g., inserted into) the charging port 124 to establish mechanical and electrical connection. A second electrical connector or second end 122 of the charging cable 116 is connected with (e.g., inserted into) the power outlet 116 to establish mechanical and electrical connection. Therefore, electrical power is transferred from the power outlet 116 to the vehicle 100 through the charging cable 118.

Storage of the charging cable 116 onboard the vehicle 100 permits the user to recharge the vehicle 100 at different power outlets (e.g., at stages along a trip, at a destination), even if the power outlets are not equipped with a charging cable to charge an electric vehicle. Vehicles such as motorcycles and other saddle-ridden vehicles further suffer from limited storage capabilities based on the size, weight, and aerodynamic considerations that are desired by users.

Figure 2:
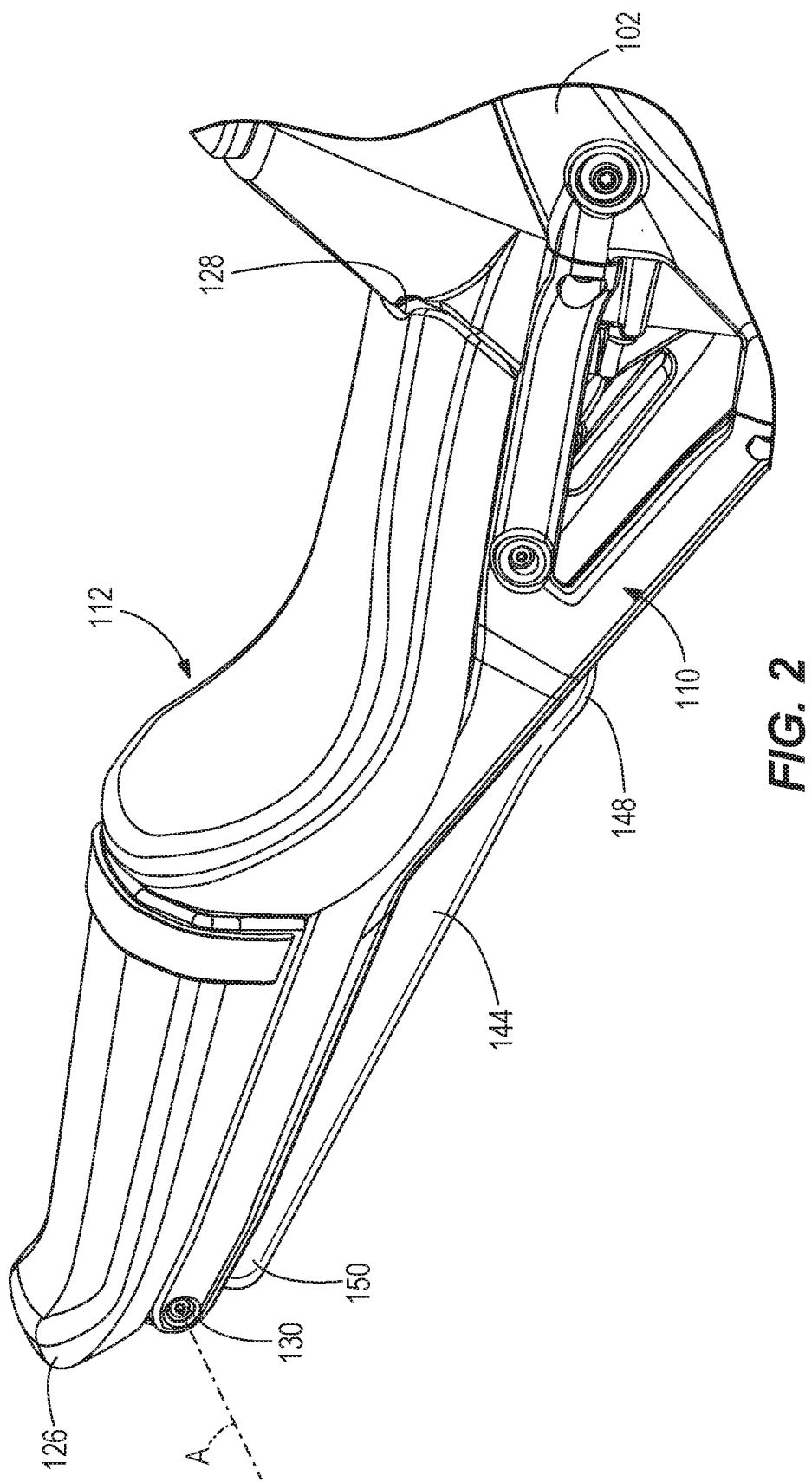
FIG. 2 is a perspective view of a seat of the vehicle in a first position.
Figure 3:
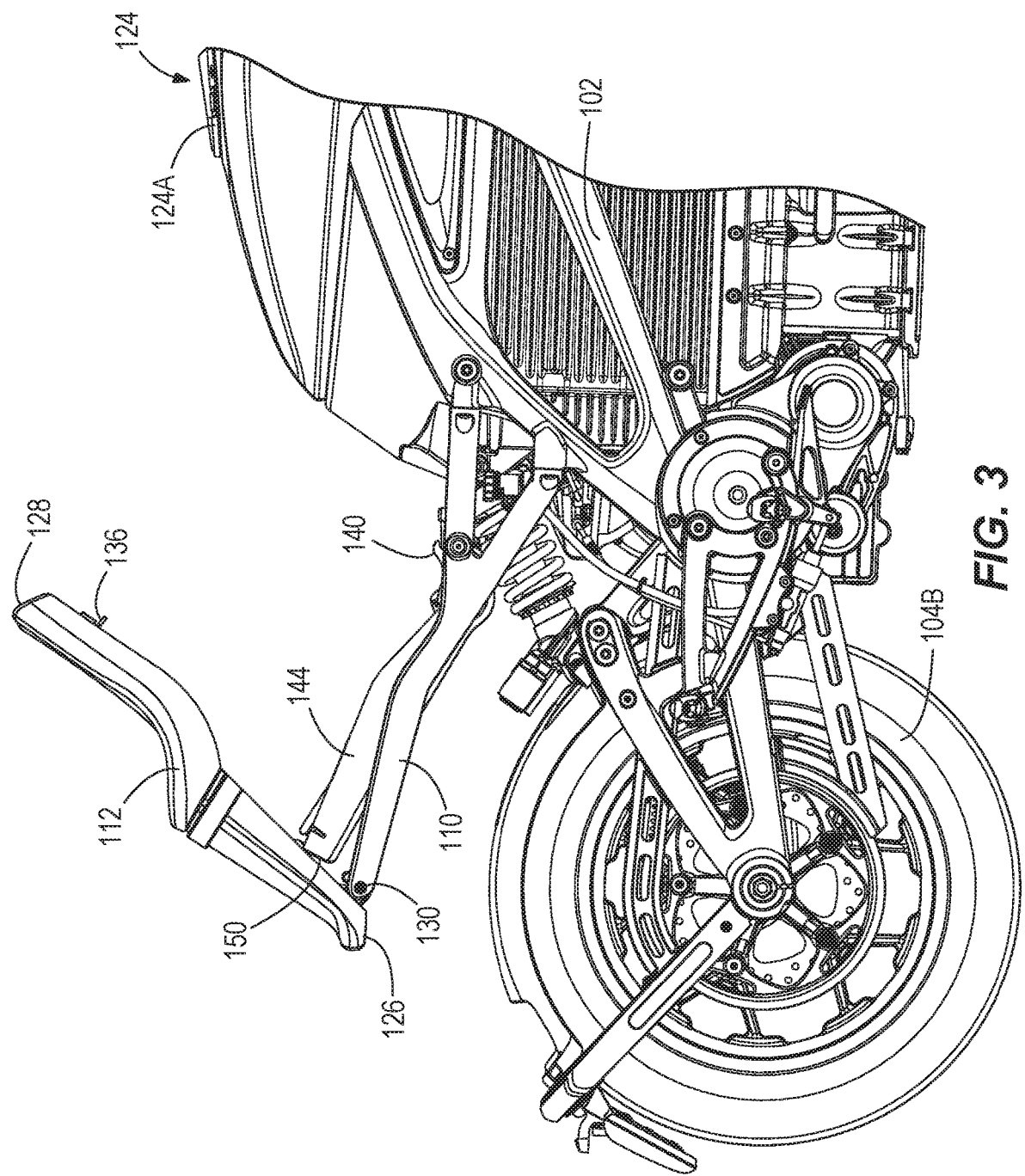
FIG. 3 is a side view of a portion of the vehicle of FIG. 1 with the seat shown in second position.
Figure 4:
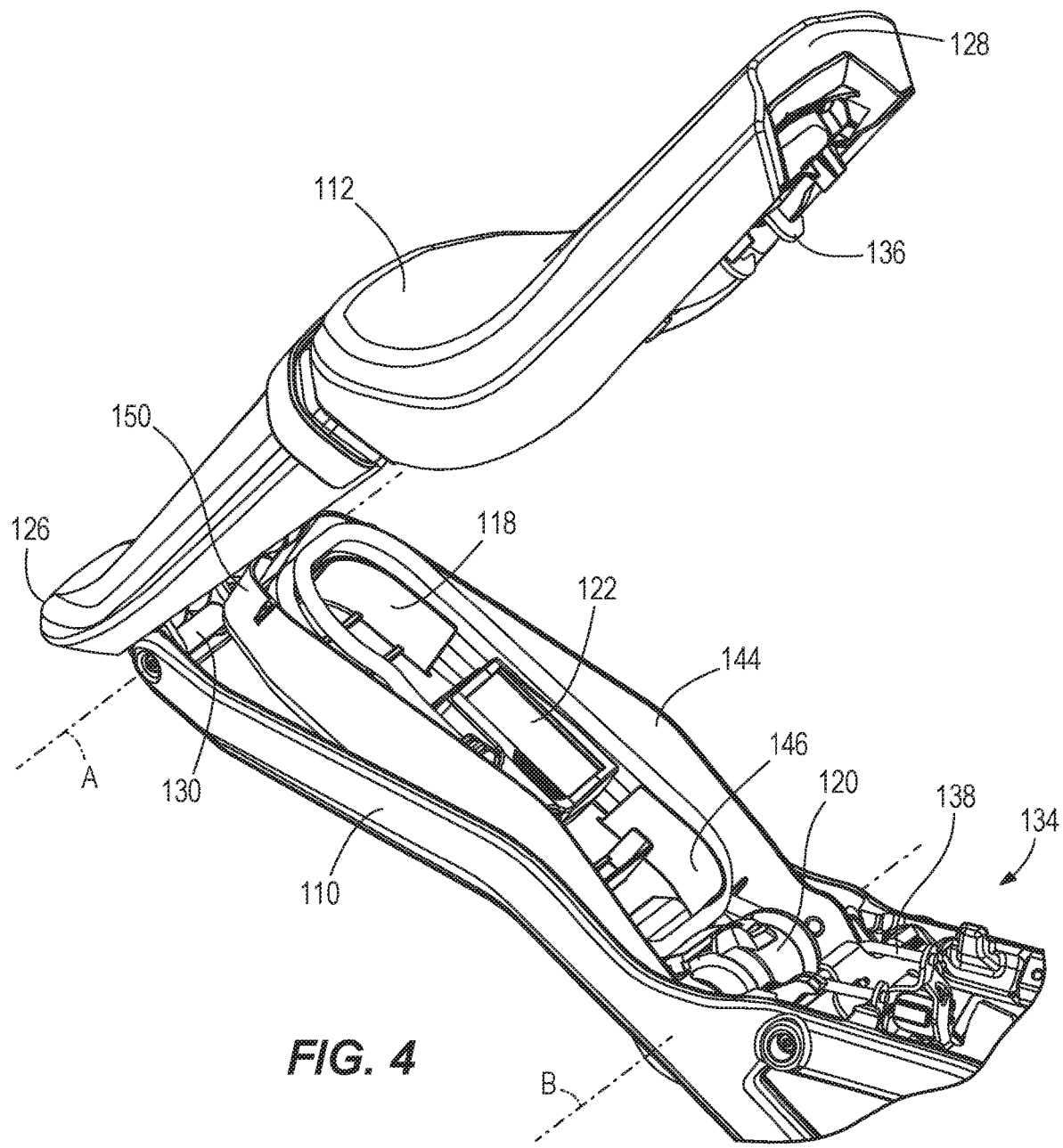
FIG. 4 is a perspective view of the seat in the second position and a caddy positioned below the seat in a presentation position.

As shown in FIG. 2, the seat 112 (which may include one or more seating surfaces for one or more users) is shown in a first position or seating position in which at least one user is able to sit or otherwise rest upon the seat 112 while operating the vehicle 100. For example, the seating surface has a horizontal orientation, while the vehicle 100 is upright. The seat 112 is coupled to the seat frame 110 at two locations. At a rear 126 of the seat 112, the seat 112 is rotationally coupled to the seat frame 110 via a pin connection 130 defining a first pivot and pivot axis A (shown in greater detail in FIG. 4). The seat 112 is rotatable relative to the seat frame 110 from the first position (FIG. 2) to a second position or raised position, as shown in FIGS. 3-4. In the raised position, the seating surface is inclined and not presented in position for supporting the user to sit on the seat 112. As appreciated from the below description, the first and second positions of the seat 112 correspond to closed and open positions, respectively, with respect to a caddy 144 under the seat 112.

At a front 128 of the seat 112, the seat 112 is (directly or indirectly) attachable to the seat frame 110 via a latch 134. More specifically, a first latch component 136 is fixed to the front 128 of the seat 112 (e.g., on the underside of the seat) and a second latch component 138 is fixed to the seat frame 110. The first and second latch components 136, 138 are engageable with one another when the seat 112 is in the first position. The latch components 136, 138 may be embodied as, for example, fingers that are biased into engagement with an opening via one or more springs. A latch release 140 is attached to either the seat frame 110 or the seat 112 and is actuated by a user (either directly, or indirectly via a button or lever 140, etc.) to disengage the first latch component 136 from the second latch component 138 and therefore disengage the seat 112 from the seat frame 110. When the latch components 136, 138 are disengaged from one another, the seat 112 is rotatable about the first pivot 130 to the second position. When the latch components 136, 138 are engaged, the seat 112 is retained in the first position.

A locking device (not shown) can lock the latch components 136, 138 in the engaged arrangement to prevent a person from rotating the seat 112 relative to the seat frame 110. The locking device can be automatically engaged when the vehicle 100 is running or is travelling above a predetermined speed threshold, or when the key is a distance away from the vehicle 100 greater than a predetermined distance (e.g., via a proximity sensor). Further, the locking device can be engaged manually by the user (e.g., via a key, via biometrics, etc.) to lock the seat 112 relative to the seat frame 110 and to prevent unwanted access to the caddy 144 positioned below the seat 112.

The caddy 144 is a container defined by a lower base 144A and a sidewall 144B (FIG. 5) that extends (entirely or at least partially) around a perimeter of the base 144A to define a storage volume therein. The underside of the seat 112 functions as a cover for the caddy 144 when the seat 112 is in the first position. The seat 112 may further form at least a portion of the sidewall, extending downward from the seating surface of the seat 112. Movement of the seat 112 to the second position opens the caddy 144. As described below, the seat 112 opens to the front to expose the storage volume of the caddy 144.

In embodiments where the vehicle 100 is a plug-in electric vehicle, the storage volume of the caddy 144 is used to hold or contain the charging cable 116 when not in use. For example, the caddy 144 can include a mounting device 146 positioned within the storage volume so that the charging cable 116 can be engaged into or onto the mounting device 146 so that the charging cable is not loose within the caddy 144 (e.g., rather, the charging cable 116 is releasably supported). In some constructions, the mounting device 146 provides one or more mounts for coiling the charging cable 116 thereon. In other constructions, the mounting device 146 can releasably retain the charging cable 116 in other ways, e.g., by clips or other fasteners. As shown, the mounting device 146 includes a raised protrusion 146A that at least partially surrounds the second electrical connector 122 to prevent movement of the second electrical connector 122 within the caddy 144. Further, a cord retainer 146B is formed within the protrusion 146A to hold a portion of the cable 118 in place relative to the caddy 144. Further still, arcuate and straight protrusions or posts 146C extend into the storage volume to accommodate a coil of the charging cable 118 wrapping thereabout. However, the charging cable 116 is not hardwired to the vehicle 100, through the caddy 144 or otherwise.

The caddy 144 is positioned between two rails of the seat frame 110 and between the pin connection 130 and latch 134 of the seat 112. The caddy 144 includes a front end 148 (nearest the front end of the seat 112) and a rear end 150 opposite the front end 148. The front end 148 of the caddy 144 is coupled to the seat frame 110 via a hinge 152. As shown, the hinge 152 includes posts 152A fixed to the seat frame 110 that extend through opposing apertures 152B in the caddy 144. In alternative embodiments, the hinge 152 can vary in structure, for example, the caddy 144 can include posts that extend into apertures in the seat frame 110. A pivot and rotational axis B of the caddy 144 relative to the seat frame 110 is defined at the hinge 152. The caddy 144 is rotatable about the rotational axis B between a stowed position and a presentation position. In the stowed position, the caddy 144 is positioned within the seat frame 110 and below a plane of the seat 112. In the presentation position, the caddy 144 is rotated upward about the rotational axis B at the front end 148 of the caddy 144 such that a portion of the caddy 144 is within and/or above a space occupied by the seat 112 when the seat 112 is in the seating position. As described in further detail below, a linkage is provided between the seat 112 and the caddy 144 for raising the caddy 144 in response to movement of the seat 112 from the seating position to the raised position, and vice versa.

Figure 5:
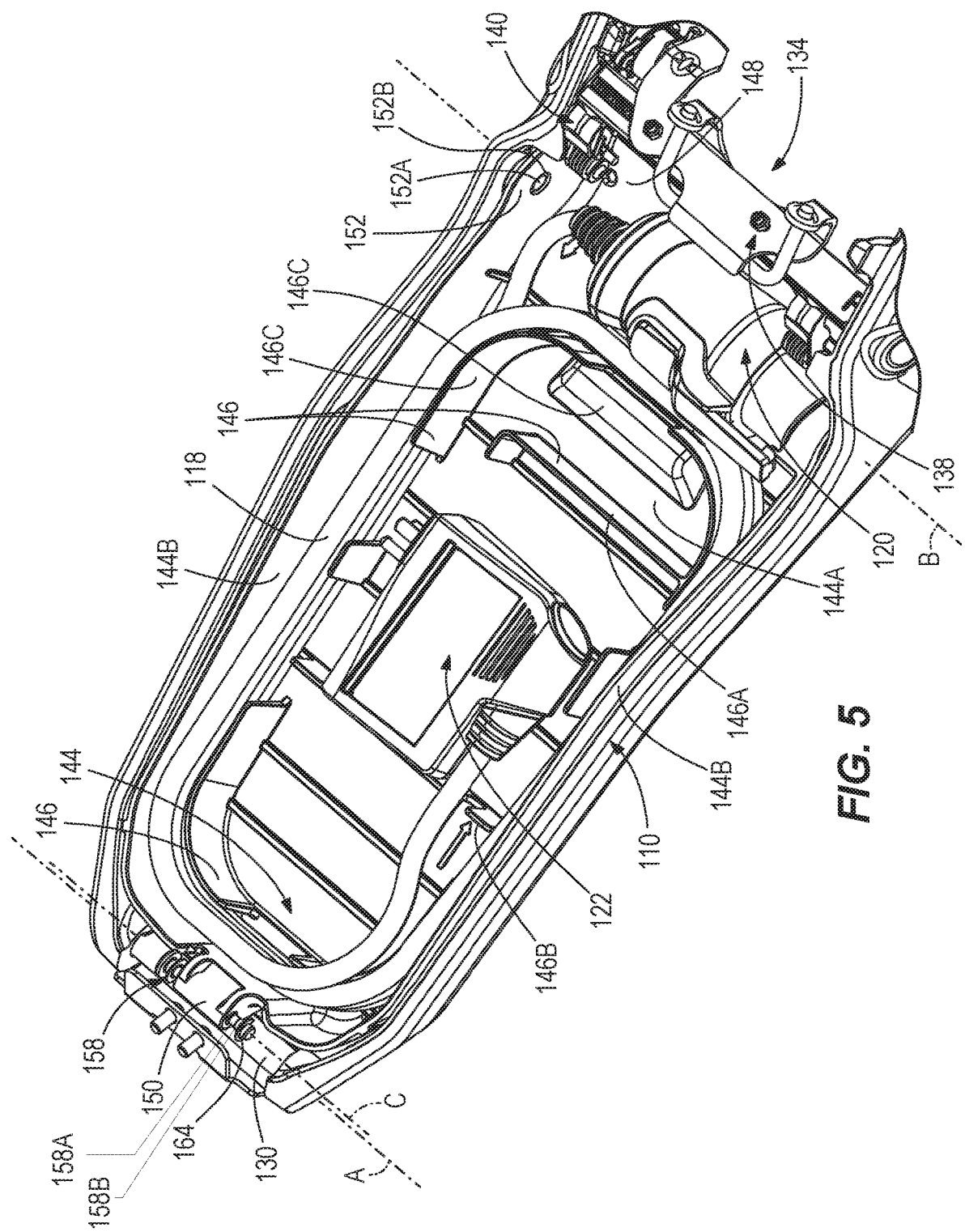
FIG. 5 is a perspective view of the caddy in the stowed position, shown without the seat.
Figure 6:
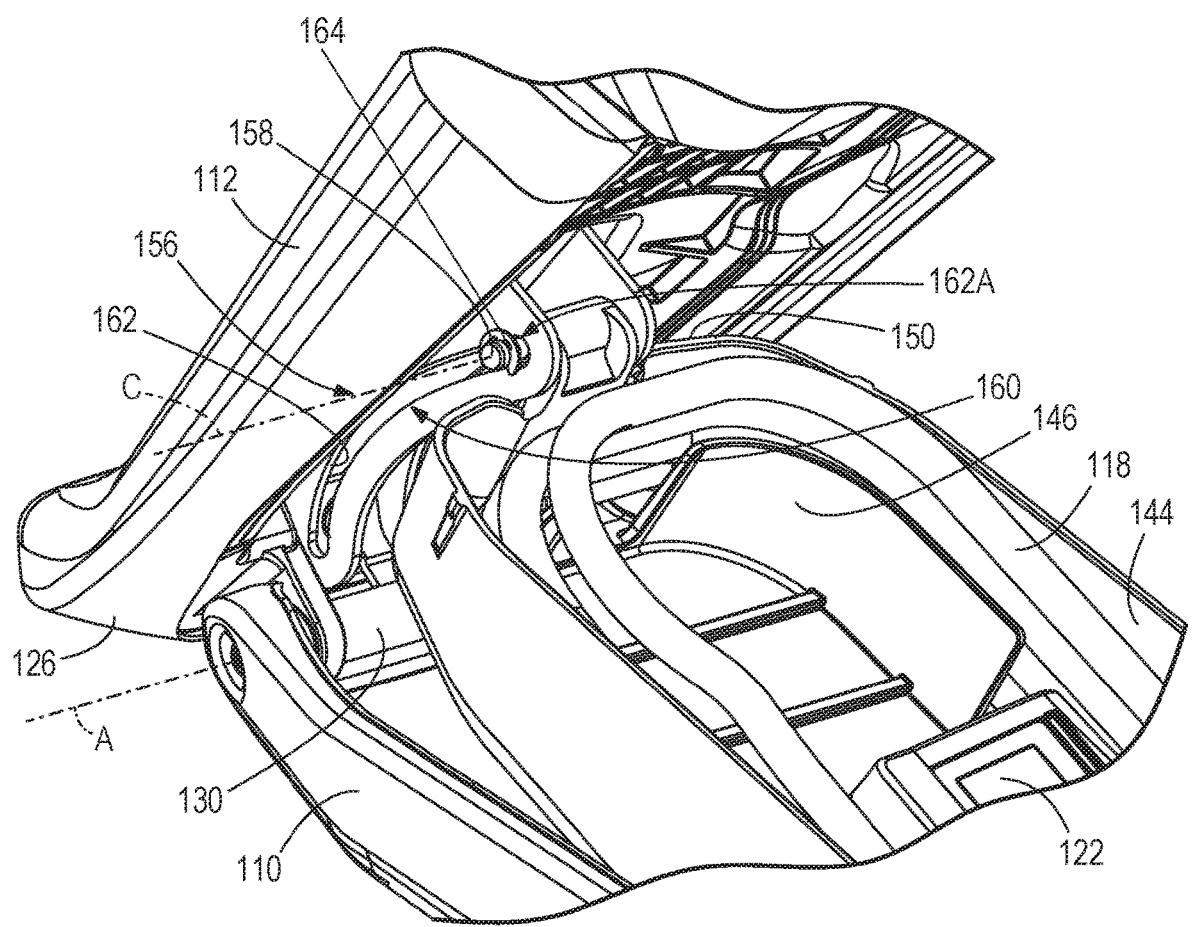
FIG. 6 is a perspective view of an interface between the seat and the caddy.
Figure 7:
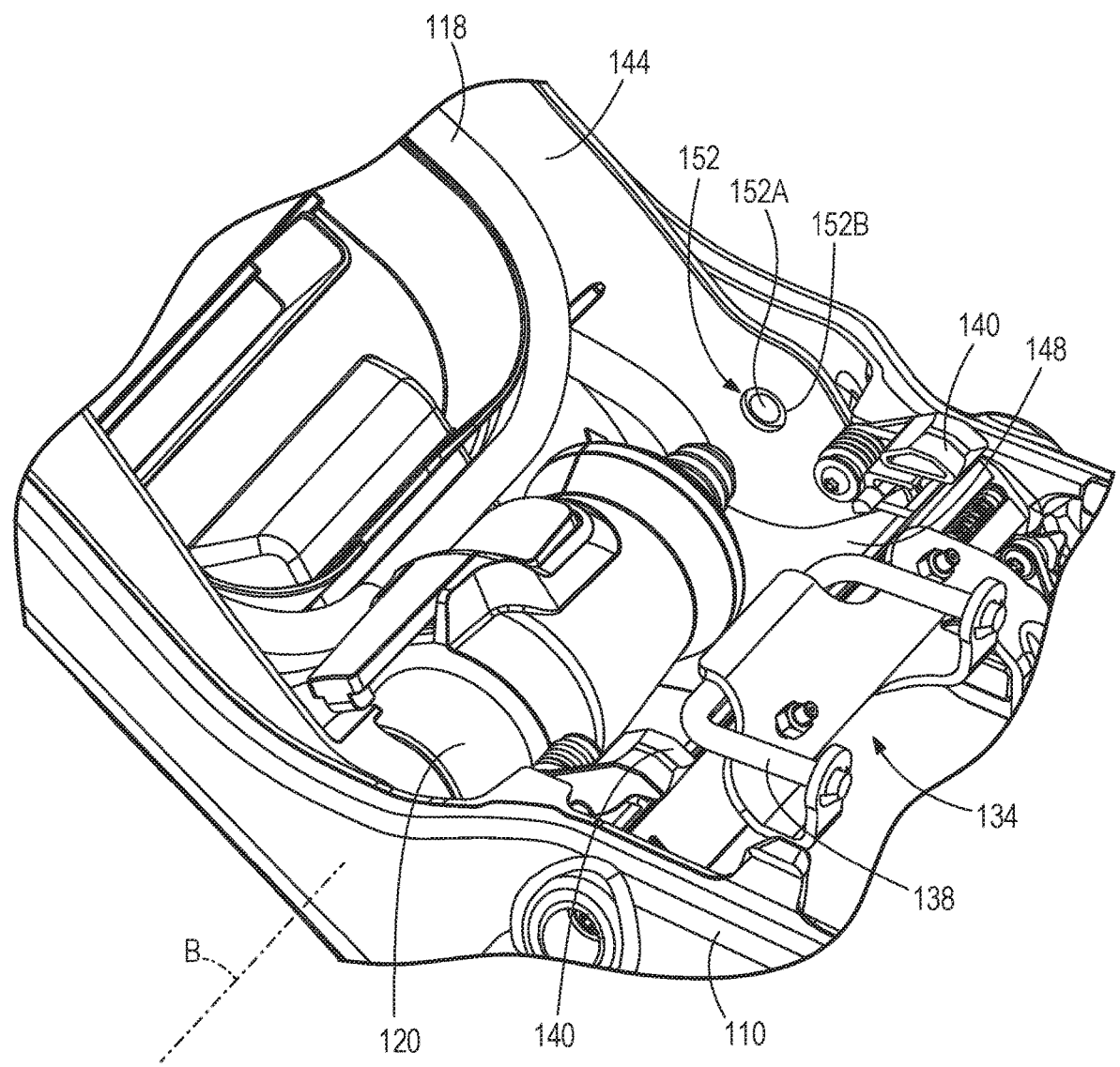
FIG. 7 is a perspective view of the front of the caddy and the pivot between the caddy and the frame.

The rear end 150 of the caddy 144 is attached to the underside of the seat 112 via a seat attachment linkage 156 as shown in FIGS. 5-6. The seat attachment linkage 156 provides a connection by which the caddy 144 is rotatable relative to the seat 112 and includes a catch pin 158 and one or more tracks 160. The pin 158 is coupled (e.g., fixed, fastened) to the rear end 150 of the caddy 144 and extends along an axis C parallel to the rotational axis B of the caddy 144. The tracks 160 are plates having an arcuate channel 162 extending therethrough, and are coupled (e.g., fastened with threaded fasteners) to the underside of the seat 112. The channels 162 are aligned with one another—such that the pin 158 extends through both channels 162, normal to the tracks 160. As shown, the tracks 160 can be integrally formed as a single component. Opposite a head end of the pin 158, a retention clip 164 can be engaged on the distal end of the pin 158 to hold the pin 158 within the channels 162. At an end 162A of the channel 162 corresponding to the second or raised position, the pin 158 can engage with a detent feature in the channel 162. The pin 158 can be provided with both smaller and larger diameter sections 158A, 158B (FIG. 5) such that the smaller diameter sections 158A form grooves that normally receive the edges of the respective channels 162. For example, this arrangement may be maintained in the first or seating position, all the way through the travel, up to the second or raised position. In the normal, non-detent arrangement, the retention clip 164 is spaced axially from the adjacent track 160 as shown in FIG. 6. However, the pin 158 is biased axially so that the larger diameter sections 158B are urged to occupy the respective channels 162. For example a spring (not shown) can be positioned between the head of the pin 158 and the adjacent track 160 so that the release of spring energy slides the pin 158 until the retention clip 164 abuts the track 160. The ends 162A of the channels 162 are enlarged to allow the spring to slide the pin 158 so that the larger diameter pin sections 158B occupy the channels 162 so that the seat 112 is automatically retained in position. The same principle can be applied at other positions to provide more than one detent position to hold the seat 112 relative to the caddy 144 at various positions (i.e., at both ends of the channels 162 and/or at intermediate positions therebetween). In other constructions, the detents may be provided by narrowing the arcuate channel(s) 162 to provide a tight fit with the pin 158, e.g., an interference fit at designated points, without requiring biasing or sliding of the pin 158.

In operation, the caddy 144 is rotated from the stowed position to the presentation position in response to the seat 112 being moved from the first position to the second position (e.g., upward rotation of the front end of the seat to go from the seating position to the inclined raised position). To access the storage volume of the caddy 144 from a condition in which the seat is in the seating position, a lock device is disengaged (either automatically or manually by the user) and the latch 134 at the front end 128 of the seat 112 is disengaged. Therefore, the seat 112 is rotatable about the pin connection 130 at the rear end 126 of the seat 112. The user rotates the seat 112 about the pin connection 130, thereby rotating the seat 112 from the seating position to the raised position. This rotation is a counter-clockwise rotation of the seat 112 from the perspective of the right side of the vehicle 100, as shown in FIG. 1.

Due to the coupling of the seat 112 and caddy 144 via the seat attachment linkage 156, as the seat 112 is rotated from the seating position to the raised position, the caddy 144 rotates about the axis B from the stowed position to the presentation position. More specifically, as the seat 112 rotates about the pin connection 130, the caddy 144 rotates about the hinge 152 and the pin 158 moves along the fixed path defined by the channels 162. The seat 112 and caddy 144 can be locked into the raised and presentation positions, respectively, by engaging the pin 158 with a catch in the end of the channel 162 or by another detent feature. In other embodiments, the weight and angle of the seat 112 hold the seat 112 and caddy 144 in the raised and presentation positions, respectively. The rotation of the caddy 144 about the hinge 152 is a clockwise rotation of the caddy 144 from the perspective of the right side of the vehicle, as shown in FIG. 1.

Once the seat 112 is in the raised position, the caddy 144 is uncovered and a user is able to remove the charging cable 118 from the mounting device 146 within the storage volume of the caddy 144. Once fully removed from the caddy 144, the first end 120 of the charging cable 118 is electrically coupled with the charging port 124 of the vehicle 100 and the second end 122 is electrically coupled with the power outlet 116 for charging the vehicle 100.

To return the seat 112 to a ridable position, the user releases the detent (if applicable) and rotates the front end 128 of the seat 112 down until the latch components 136, 138 are engaged. As the seat 112 rotates back toward the seating position, the caddy 144 rotates back from the presentation position to the stowed position, as the pin 158 travels along the channels 162. The lock device can be automatically or manually engaged to prevent accidental disengagement of the latch 134.

Elements referred to by the term "front" or "rear" are to be understood based on the normal non-reversing direction of travel of the vehicle. For example, the front wheel 104A of the motorcycle is the leading wheel of the vehicle 100 as the vehicle 100 travels forward. Likewise, the front 128 of the seat 112 and the front of the caddy are understood to refer to the portions of the seat 112 and caddy nearest the front of the vehicle 100. Similarly, the rear 126 of the seat 112 and the rear of the caddy are understood to refer to the portions of the seat 112 and caddy nearest the rear of the vehicle 100.

What is claimed is:

1. An electric vehicle rechargeable via electric power transferred from a power outlet separate from the vehicle, the electric vehicle comprising:
   a seat movable between a first position for supporting a person and a second position;
   a caddy positioned below the seat to define a cable storage volume, wherein the cable storage volume is accessible when the seat is in the second position;
   a linkage coupled between the seat and the caddy operable to lift the caddy to a presentation position in response to movement of the seat from the first position to the second position;
   a charging port positioned outside of the caddy and accessible with the seat in the first position; and
   a charging cable positioned within the cable storage volume of the caddy, the charging cable having a first end engageable with the charging port of the vehicle and a second end engageable with the power outlet;
   wherein the first and second ends of the charging cable are removable from the caddy when the seat is in the second position to enable charging the electric vehicle via the charging cable and the charging port.

2. The electric vehicle of claim 1, further comprising a detent for locking the caddy in the presentation position.

3. The electric vehicle of claim 2, wherein the detent is provided between a pin and a channel of a track in which the pin is retained, the pin and the channel of the track forming at least part of the linkage.

4. The electric vehicle of claim 1, wherein an interior of the caddy includes a mounting device for releasably supporting the charging cable.

5. The electric vehicle of claim 1, further comprising a latch operable to retain the seat in the first position, and a pivot positioned at a rear end of the seat, wherein the latch is located at a front of the seat, and wherein the seat is rotatable about the pivot from the first position to the second position.

6. The electric vehicle of claim 1, wherein a forward end of the seat is lifted upward in the second position as compared to the first position.

7. The electric vehicle of claim 1, wherein the caddy is rotatably mounted to be rotatable between a stowed position and the presentation position.

8. The electric vehicle of claim 7, wherein the caddy is rotated from the stowed position to the presentation position by movement of the seat to the second position.

9. The electric vehicle of claim 1, wherein the seat is lockable in the first position.

10. A method of operating an electric vehicle, the method comprising:
   releasing a seat of the vehicle from a first position in which a seating surface of the seat is presented for seating a vehicle user, and moving the seat to a second position to uncover a caddy having a charging cable therein;
   lifting the caddy from a stowed position to a presentation position by a linkage between the seat and the caddy in response to movement of the seat to the second position;
   removing the charging cable, including both first and second ends thereof, from the underseat caddy;
   attaching the first end of the charging cable to a power outlet spaced from the vehicle; and
   attaching the second end of the charging cable to a charging port provided on the vehicle at a position outside of the caddy.

11. The method of claim 10, further comprising returning the seat to the first position, and supplying charging current through the charging cable from the power outlet to the charging port with the seat secured in the first position.

12. A vehicle comprising:
   a frame;
   a seat for supporting a person, the seat being rotatable relative to the frame between a first position and a second position, the seat including a latch engageable with the frame for selectively holding the seat in the first position, the seat further including a first pivot defining a first rotational axis about which the seat is rotatable from the first position to the second position;
   a caddy positioned below the seat and rotatable relative to the frame between a stowed position and a presentation position, the caddy including a second pivot defining a second rotational axis about which the caddy is rotatable from the stowed position to the presentation position; and
   a linkage provided between the caddy and the seat and operable to rotate the caddy from the stowed position to the presentation position in response to movement of the seat between the first and second positions.

13. The vehicle of claim 12, wherein when the seat is in the first position, the caddy is in the stowed position, and when the seat is in the second position, the caddy is in the presentation position.

14. The vehicle of claim 12, wherein the first rotational axis is offset from and parallel to the second rotational axis.

15. The vehicle of claim 12, wherein the seat includes a front end and a rear end, and wherein the first pivot is located at the rear end of the seat.

16. The vehicle of claim 15, wherein the second pivot is located at a front end of the caddy, and wherein the linkage is coupled to a rear end of the caddy.

17. The vehicle of claim 12, wherein, in the second position, at least a portion of the seat is raised relative to the first position, and wherein, in the presentation position, at least a portion of the caddy is raised relative to the stowed position.

18. The vehicle of claim 12, wherein the vehicle is a plug-in electric vehicle, and wherein the caddy includes a storage volume includes a mounting device for releasably supporting a charging cable.

19. The vehicle of claim 12, wherein the seat rotates in a first rotational direction about the first rotational axis from the first position to the second position, wherein the caddy rotates in a second rotational direction about the second rotational axis from the stowed position to the presentation position, wherein the second rotational direction is opposite the first rotational direction.

20. An electric vehicle rechargeable via electric power transferred from a power outlet separate from the vehicle, the electric vehicle comprising:
   a seat movable between a first position for supporting a person and a second position;
   a caddy positioned below the seat to define a cable storage volume, wherein the cable storage volume is accessible when the seat is in the second position;
   a charging port positioned outside of the caddy and accessible with the seat in the first position; and
   a charging cable positioned within the cable storage volume of the caddy, the charging cable having a first end engageable with the charging port of the vehicle and a second end engageable with the power outlet;
   wherein the first and second ends of the charging cable are removable from the caddy when the seat is in the second position to enable charging the electric vehicle via the charging cable and the charging port;
   wherein the caddy is rotatably mounted to be rotatable between a stowed position and a presentation position.

21. The electric vehicle of claim 20, wherein the caddy is rotated from the stowed position to the presentation position by movement of the seat to the second position.

* * * * *